(12) United States Patent
Bai et al.

(10) Patent No.: US 7,475,164 B2
(45) Date of Patent: Jan. 6, 2009

(54) APPARATUS, SYSTEM, AND METHOD FOR AUTOMATED DEVICE CONFIGURATION AND TESTING

(75) Inventors: Angqin Bai, Tucson, AZ (US); Kent P. Bortz, Tucson, AZ (US); Jose Guillermo Miranda Gavillan, Tucson, AZ (US); Khanh Vi Ngo, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 285 days.

(21) Appl. No.: 11/364,322

(22) Filed: Feb. 28, 2006

(65) Prior Publication Data

US 2007/0204071 A1    Aug. 30, 2007

(51) Int. Cl.
*G06F 3/00*     (2006.01)
*G06F 11/00*    (2006.01)

(52) U.S. Cl. ............................. 710/8; 714/32
(58) Field of Classification Search ............ 710/8, 710/10, 15, 17, 18, 19; 714/32, 733, 799; 364/765
See application file for complete search history.

(56) References Cited

U.S. PATENT DOCUMENTS

| | | | | |
|---|---|---|---|---|
| 4,860,290 A | * | 8/1989 | Daniels et al. | 714/726 |
| 5,056,001 A | * | 10/1991 | Sexton | 710/10 |
| 5,804,960 A | * | 9/1998 | El Ayat et al. | 324/158.1 |
| 5,887,165 A | * | 3/1999 | Martel et al. | 713/100 |
| 5,923,899 A | * | 7/1999 | Martin et al. | 710/8 |
| 6,028,439 A | * | 2/2000 | Arkin et al. | 324/765 |
| 6,057,706 A | * | 5/2000 | Barbier et al. | 326/39 |
| 6,374,352 B1 | | 4/2002 | Goldman et al. | |
| 6,476,628 B1 | * | 11/2002 | LeColst | 324/765 |
| 6,941,450 B2 | | 9/2005 | Atherton et al. | |
| 7,024,330 B2 | * | 4/2006 | Klinck | 702/123 |
| 7,053,648 B2 | * | 5/2006 | DeVey | 324/765 |
| 7,084,659 B2 | * | 8/2006 | Delucco et al. | 324/765 |
| 7,089,472 B2 | * | 8/2006 | Shih et al. | 714/733 |
| 7,213,183 B2 | * | 5/2007 | Gossmann | 714/724 |
| 2003/0014618 A1 | | 1/2003 | Cabezas et al. | |

* cited by examiner

*Primary Examiner*—Khanh Dang
(74) *Attorney, Agent, or Firm*—Kunzler & McKenzie

(57) ABSTRACT

An apparatus, system, and method are disclosed for automated device configuration and testing. The present invention teaches receiving and implementing a configuration request form a host, receiving and executing a power cycle request, and receiving and implementing a test request. In certain embodiments, the present invention teaches responding to a target device discovery request, communicating a test execution status, and communication a current operation status request. In certain embodiments, the present invention also teaches accessing configuration data received from the host device or within a local configuration data repository.

19 Claims, 4 Drawing Sheets

APPARATUS, SYSTEM, AND METHOD FOR AUTOMATED DEVICE CONFIGURATION AND TESTING

BACKGROUND OF THE INVENTION

1. Field of the Invention

This invention relates generally to means and methods for configuring and testing devices and more particularly relates to apparatus, systems, and methods for automatically configuring and testing devices.

2. Description of the Related Art

Computer systems and networks are seen throughout today's technological landscape and facilitate a large variety of social, economic, and educational goals. A computer network often includes two or more devices including a host device and a target device. Vital to the proper performance of most computer networks is ensuring each target device within the computer system is completely and accurately configured. Ensuring complete and accurate device configuration of a target device not only involves configuring the device, but also testing the device configuration.

When a target device is tested, typically the device is manually configured with a set of hardware and software configurations. Then, a host device often executes a test script to exercise the target device. Next, a user stops the test, manually reconfigures the hardware and software settings, and then starts the test again. In computer systems with multiple configurations or target devices, this substantially manual process is repeated until the testing has been completed on all the target devices. This can be a very complex and time-consuming process.

FIG. 1 is a block diagram of a non-automated configuration system 100 consistent with the aforementioned device configuration approach. The depicted configuration system includes a host device 110, a host terminal 120, a target device 130, and a target device terminal 140. The host device 110 can be any device configured to run tests on the target device 130. Typically, such host devices 110 can be servers running tests on clients, library controllers testing library subsystems, and host devices testing storage subsystems. Typically, users manually enter the test commands and device configurations at the terminals 120 and 140, and then initiate the tests from those terminals.

One disadvantage of the current art is that the process results in a sometimes error-prone configuration and testing process. As users configure and reconfigure hardware and software settings, they can make mistakes, especially when multiple configurations must be entered and tested on multiple target devices. In addition to being error prone, manual configuration is often inefficient as it necessarily involves human labor and extended periods of time to perform. Furthermore, testing a configuration or set of configurations often requires users to constantly monitor the testing process, further decreasing efficiency by requiring additional man power.

From the foregoing discussion, it should be apparent that a need exists for an apparatus, system and method for automated configuring and testing of target devices. Beneficially, such an apparatus, system and method would increase testing and configuration efficiency by decreasing the probability of human error, decreasing the overall configuration time, and decreasing the man power required to configure and test target devices.

SUMMARY OF THE INVENTION

An apparatus is provided with a plurality of modules configured to functionally execute the necessary steps to automatically configure and test a device. In one embodiment, the apparatus comprises a communication module configured to interact with a network interface, receive a configuration request from a host network management host, and provide a configuration request to a configuration module. The configuration module configured to implement the configuration request and modify a hardware or software setting. The communication module further configured to receive a power cycle request from the network management host and transmit the power cycle request to a power control module. The power control module configured to execute the power cycle request by restarting one or more operations. The communication module further configured to receive a test request from the network management host and transmit the test request to a test execution module. The test execution module configured to execute the test request.

In another embodiment, a computer readable medium tangibly embodying a program of machine-readable instructions executable by a digital processing apparatus to perform an operation for managing control path commands of an automated data storage library. The operation comprising receiving a configuration request from a network management host, implementing the configuration request and modifying a hardware or software setting, receiving a power cycle request from the network management host, executing the power cycle request by restarting one or more operations, receiving a test request from the host, and executing the test request.

A system to automatically configure and test devices. The system may comprise a network management host and at least one target node configured to communicate over a network. The network management host configured to provide a configuration request to the at least one target node over the network. The at least one target node configured to receive and implement the configuration request via processes local to the target node. The network management host further configured to send a power cycle request to the target node over the network. The at least one target node configured to receive and execute the power cycle request via processes local to the target node. The network management device further configured to send a test request, and the at least one target node further configured to receive and execute the test request via processes local to the target node.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
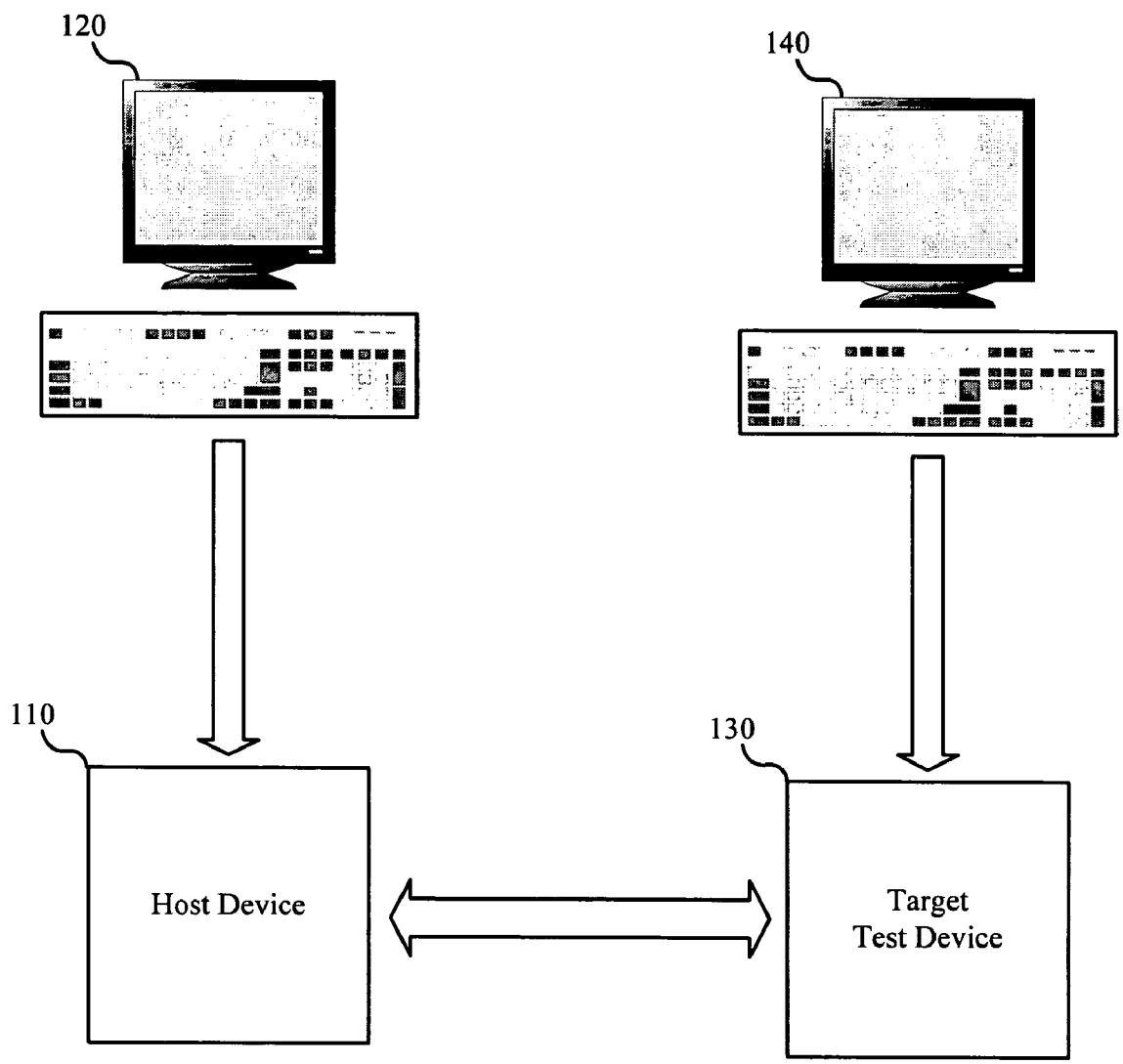
FIG. 1 is a schematic block diagram depicting one embodiment of a prior art system for device configuration and testing.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 2:
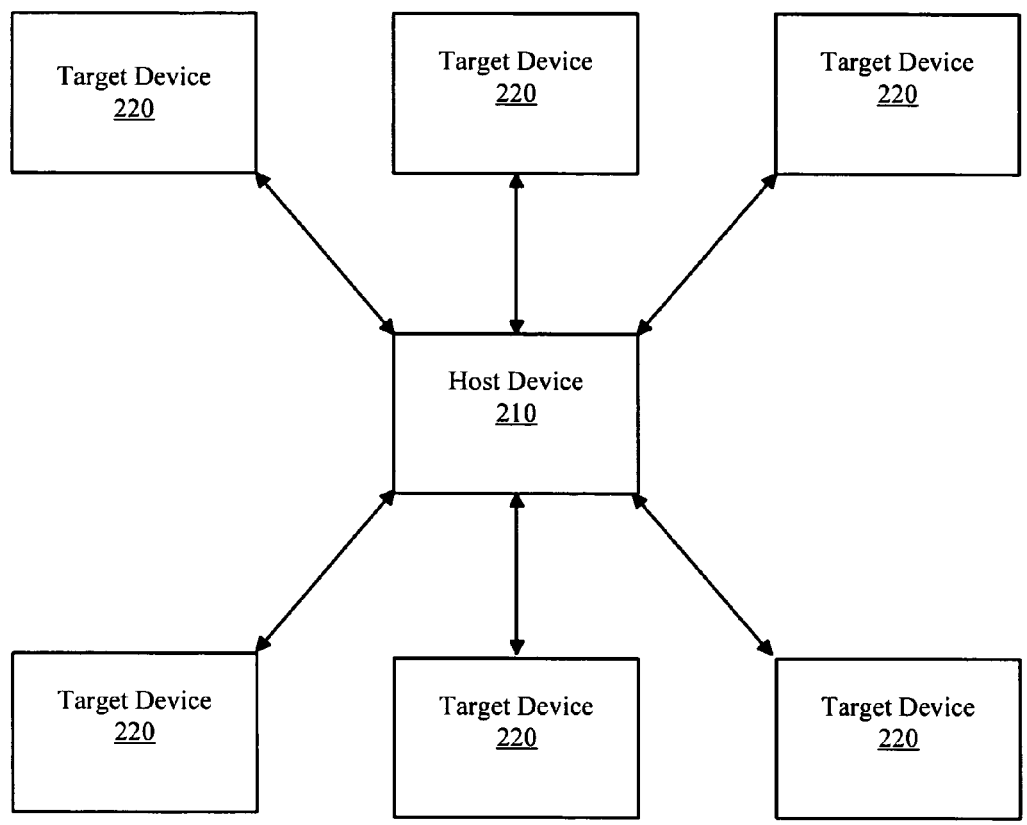
FIG. 2 is a schematic block diagram depicting one embodiment of an automated device configuring and testing system in accordance with the present invention.

FIG. 2 is a schematic block diagram of an automated device configuration and testing system 200. As depicted, the automated device testing system 200 includes a host device 210 and one or more target devices 220. The system 200 increases testing efficiency by enabling an entirely automated approach to device configuration and testing.

The host device 210 sends a configuration request to one or more of the target devices 220. The host device 210 and target devices 220 may be any device capable of performing the operations described herein. In certain embodiments, the host device 210 may be a server or other computer system designed for managing or monitoring networking devices. The target device 220 may include any device having a configuration and capable of communicating with the host device 210. More specifically, the target devices 220 may include such devices as routers, switches, storage products, media changers, or storage subsystems. The target devices 220 each receive and implement the configuration request. Having a host device 210 automatically send a configuration request to multiple target devices 220 increase configuration efficiency by eliminating the time and human resources necessary in manual configuration approaches.

The host also sends a power cycle request to the target devices 220. In certain embodiments, the target devices 220 accept the configuration request, and reply to the host device 210 with a "good status". The power cycle request is received and implemented by the target devices 220. Implementing a power cycle request ensures the target device is ready to operate under the recently implemented configuration.

The host device 210 sends a test request to the target devices 220. The test request is received and implemented by the target devices 220. Implementing a test request enables the system 200 to ascertain the operation status of the target device 220 under the newly implementing configuration.

In certain embodiments, the host device 210 may also send a target device discovery request. In many embodiments, the host device 210 sends a target device discovery request directly following a target device power cycle, as the target device will have a new configuration and must be discovered by the host device 210. In such embodiments, the target devices 220 may respond to the target device discovery request. In certain embodiments, the host device 210 removes the existing target devices 220 before sending the target device discovery request.

Figure 3:
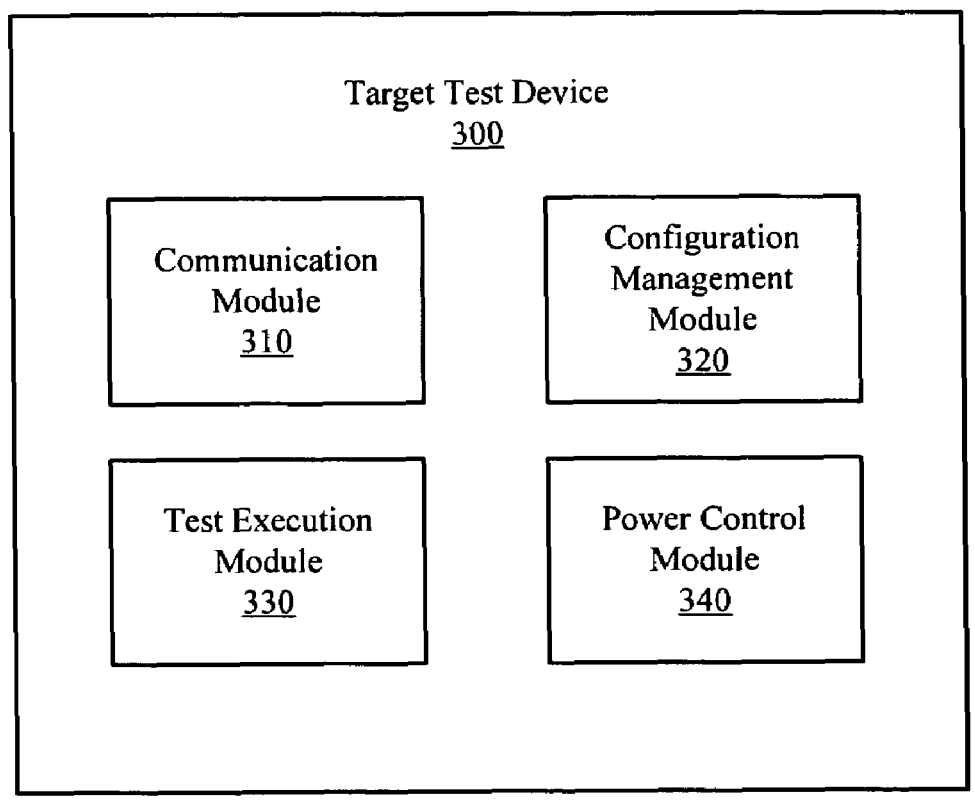
FIG. 3 is a schematic block diagram of one embodiment of a target device in accordance with the present invention.

FIG. 3 is a schematic block diagram of a target device 300 in accordance with the present invention. The depicted target device 300 includes a communication module 310, a configuration module 320, a test execution module 330, and a power control module 340. The modules of the target device 300 cooperate to receive and implement a configuration request, a power cycle, and a test request.

The communication module 310 receives a configuration request from a host 210. A configuration request may include a variety of elements including a request to implement selected hardware or software settings. The configuration module 320 implements the configuration request. Implementing a configuration request may include, for example, altering the port and zone allocation in a networking switch. In certain embodiments, the configuration module 320 accesses configuration data received from the host device. In other embodiments, the configuration module 320 accesses configuration data in a local configuration data repository (not shown). In other embodiments, the configuration module 320 accesses a combination of configuration data from the host device and configuration data in a local configuration data repository.

The communication module 310 also receives a power cycle request that is executed by the power control module. Implementing a power cycle may include, for example, restarting one or more operations within the target device 300. In some embodiments, implementing a power cycle includes restarting the entire target device 300. Implementing a power cycle enables the present invention to ensure the recently implemented configuration or fully implemented.

The communication module 310 also receives a test request that is executed by the test execution module 330. Executing a test request may include a wide variety of operations such as implement logic or verify any functional aspect or operation of the target device. In certain embodiments, the test is intended to ascertain whether the recently implemented configuration is operating as intended.

In certain embodiments, the communication module 310 also communicates a test execution status to the host device 210. A test execution status may include whether a requested test was performed completely and properly. Obtaining a test execution status may verify that the target device is prepared for the next configuration operation such as a power cycle or a new configuration request.

In some embodiments, the communication module 310 also communicates the current operation status of the target device 300. The current operation status may include a variety of data including whether a portion, segment, function, or set of functions are operating properly within the target device. Other forms of operation status data may include overall performance data indicating the performance welfare of the target device as a whole. In certain embodiments, the operation status may be communicated before implementing a particular configuration to ensure a new configuration is warranted or to compare operability of the target device under two different configurations.

Figure 4:
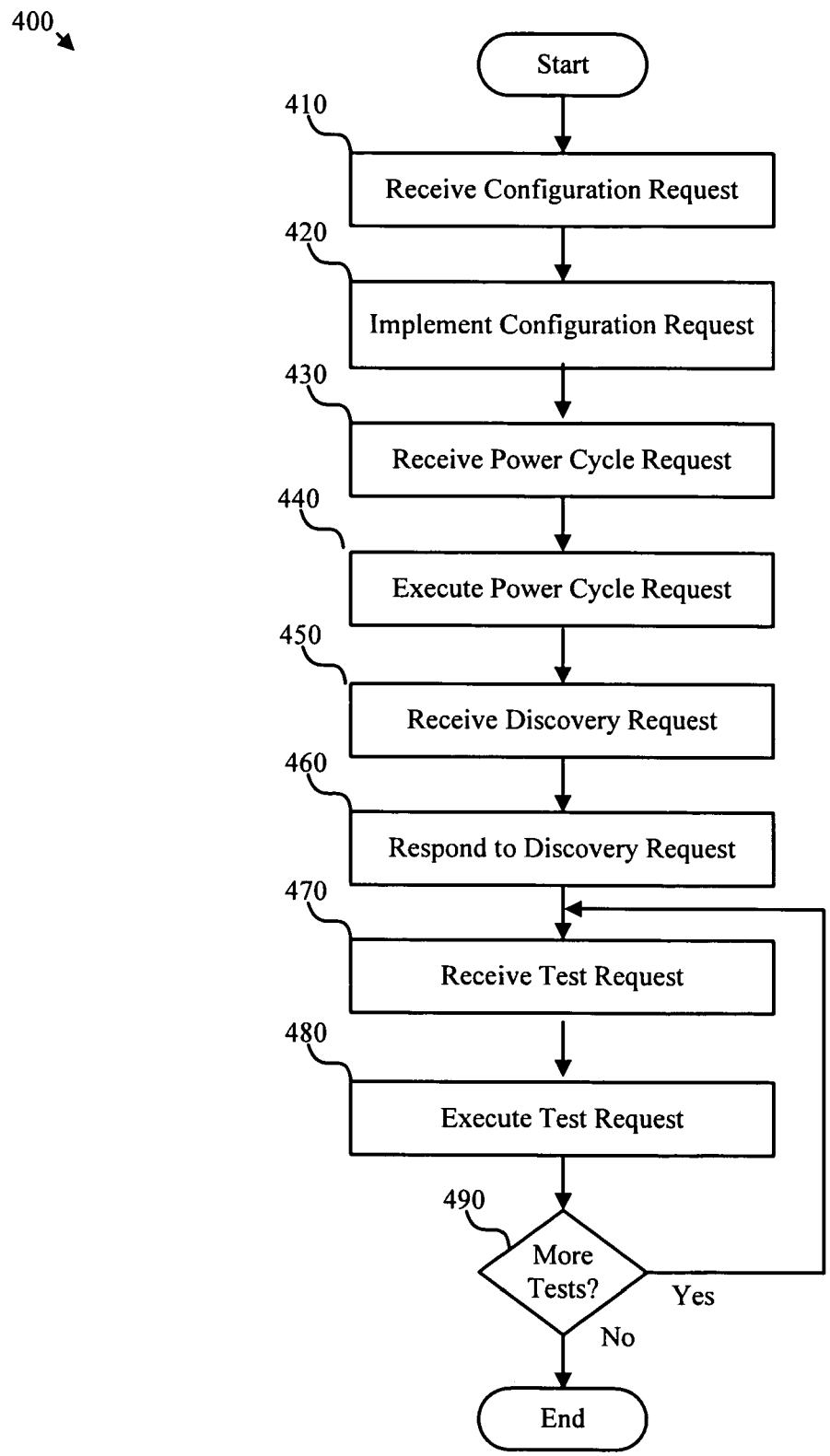
FIG. 4 is a schematic flow chart diagram depicting one embodiment of an automated device configuring and testing method.

FIG. 4 is a flow chart diagram of an automated device configuration and testing method. The depicted method 400 includes receiving 410 a configuration request, implementing 420 the configuration request, receiving 430 a power cycle request, executing 440 the power cycle request, receiving 450 a target device discovery request, responding 460 to the target device discovery request, receiving 470 a test request, executing 480 the test request, and determining 490 whether more tests are required. The operations of the method 400 increase target device configuration accuracy and efficiency by enabling and entirely automated configuration and testing approach.

Receiving 410 a configuration request may include a communication module 310 of a target device 220 receiving a configuration request from a host device 210. Implementing 420 the configuration request may include a configuration module 320 updating or otherwise changing software and/or hardware settings of the target device 220. In certain embodiments, implementing 420 the configuration request may also include the configuration module 320 accessing configuration data stored locally in a configuration data repository or receiving configuration data from the host device 210.

Receiving 430 a power cycle request may include a communication module 310 receiving a power cycle request from a host device 210. Executing 340 the power cycle request may include a power control module 340 restarting one or more operations within the target device 300, or restarting the entire target device 300. Receiving 440 a discovery request may include a communication module 310 receiving a discovery request from a host device 210.

Responding 460 to the discovery request may include a communication module 310 responding to the target device discovery request of a host device 210. Receiving 450 and responding 460 to a target device discovery request may be particularly necessary in embodiments wherein the newly configured target device 220 is not initially recognized by the host device 210. Receiving 470 a test request may include a communication module 310 receiving a test request from a host device 210. Executing 480 the test request may include a test implement nation module 330 running a test requested by the host device 210.

Determining 490 whether more tests are required may include a communication module 310 communicating a test execution status to a host device 210 and the host device responding with an additional test request. In other embodiments determining 490 whether more tests are required may include receiving a local error in response to executing 470 the test request. If more tests are required, more test requests are received 470. If more tests are not required, the operations end.

In certain embodiments, the method 400 may also include an operation for communicating the current operation status of the target device 220 to the host device 210. Communicating the current operation status of the target device 220 may become before or after the implementation and test of a given configuration. Obtaining the current operation status before implementing a new configuration may help in ascertaining whether a new configuration is needed or whether a new configuration is under way. Obtaining the current operation status after testing may help ascertain whether a newly configured target device 220 is operating as intended or ready to implement a test request after a power cycle.

In certain embodiments, the method 300 may also include the operation of communicating a test execution status. Communicating a test execution status enables the host device 210 to ascertain whether a test has been received and implemented. The test execution status may also help to determine whether a recently implemented configuration is operating properly.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for automated network node configuration, the apparatus comprising;
   a communication module configured to interact with a network interface, receive a configuration request from a network management host, and provide a configuration request to a configuration module;
   the configuration module configured to implement the configuration request and modify a hardware or software setting;
   the communication module further configured to receive a power cycle request from the network management host and transmit the power cycle request to a power control module;
   the power control module configured to execute the power cycle request by restarting one or more operations;

the communication module further configured to receive a test request from the network management host and transmit the test request to a test execution module; and the test execution module configured to execute the test request.

2. The apparatus of claim 1, wherein the communication module is further configured to indicate that the target node is network operable in response to a target node discovery request.

3. The apparatus of claim 1, wherein the configuration module is configured to access configuration data received from the network management host.

4. The apparatus of claim 1, wherein the configuration module is further configured to access a local configuration data repository.

5. The apparatus of claim 1, wherein the communication module is further configured to communicate a current operation status.

6. The apparatus of claim 1, the communication module is further configured to communicate a test execution status to the network management host.

7. A computer readable medium tangibly embodying a program of machine-readable instructions executable by a digital processing apparatus to perform an operation for managing control path commands of an automated data storage library, the operation comprising:

receiving a configuration request from a network management host;

implementing the configuration request and modifying a hardware or software setting;

receiving a power cycle request from the network management host;

executing the power cycle request by restarting one or more operations;

receiving a test request from the host;

and executing the test request.

8. The computer readable medium of claim 7, further comprising responding to a target node discovery request.

9. The computer readable medium of claim 7, further comprising receiving configuration data from the network management host.

10. The computer readable medium of claim 7, further comprising accessing a local configuration data repository.

11. The computer readable medium of claim 7, further comprising communicating a current operation status to the network management host.

12. The computer readable medium of claim 7 further comprising, communicating a test execution status to the network management host.

13. A system for automated testing of a node in a network, the system comprising:

a network management host and at least one target node configured to communicate over a network;

the network management host configured to provide a configuration request to the at least one target node over the network;

the at least one target node configured to receive and implement the configuration request via processes local to the target node;

the network management host further configured to send a power cycle request to the target node over the network;

the at least one target node configured to receive and execute the power cycle request via processes local to the target node;

the network management device further configured to send a test request; and the at least one target node further configured to receive and execute the test request via processes local to the target node.

14. The system of claim 13, wherein the network management host is further configured to send a target node discovery request.

15. The system of claim 13, wherein the at least one target node is further configured to respond to the target node discovery request.

16. The system of claim 13, wherein the at least one target node is configured to access a local repository of configuration information.

17. The system of claim 13, wherein the at least one target node is further configured to receive configuration data from the network management device.

18. The system of claim 13, wherein the at least one target node is further configured to respond to a current operation status request from the network management host.

19. The system of claim 13, wherein the at least one target node is further configured to communicate a test execution status to the network management host.

* * * * *